Nov. 18, 1947.  W. VAN DEN BERGH ET AL  2,431,096
LIFTING TRUCK
Filed June 10, 1946    2 Sheets-Sheet 2

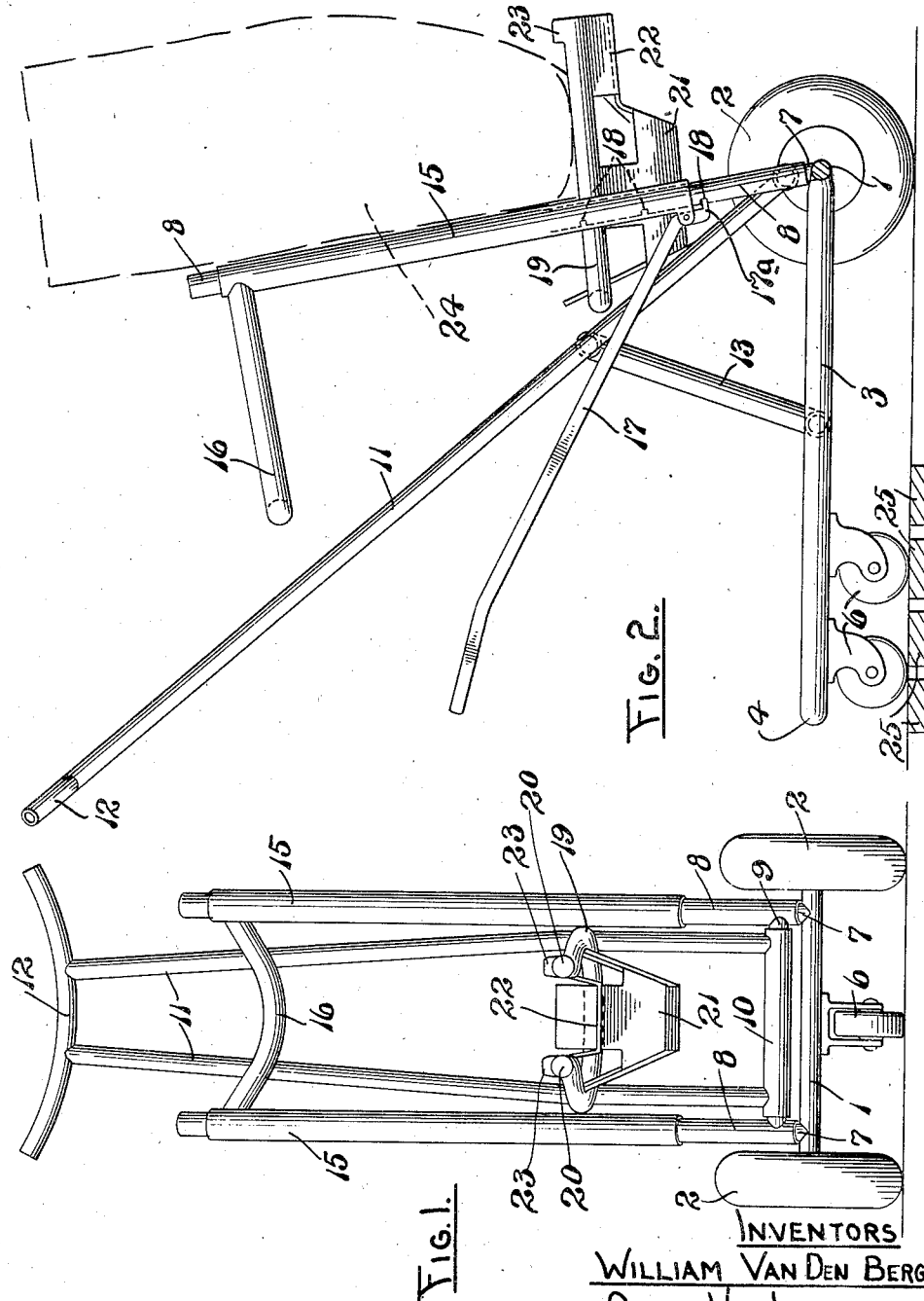

INVENTORS
WILLIAM VAN DEN BERGH
OLIN H. JOHNSON
CHARLES PASTOOR
By Liverance and Van Antwerp
ATTORNEYS Patented Nov. 18, 1947

2,431,096

UNITED STATES PATENT OFFICE 2,431,096

LIFTING TRUCK

William Van Den Bergh, Olin H. Johnson, and Charles Pastoor, Grand Rapids, Mich., assignors to Grand Rapids Packing Company, Grand Rapids, Mich., a corporation of Michigan Application June 10, 1946, Serial No. 675,788

4 Claims. (Cl. 214—75)

This invention relates to a novel truck for the transportation of heavy articles. The truck is of the hand truck type or variety, pushed from one place to another, and is supplied with means for holding the article to be carried and further for loading the truck at a low position and thereafter lifting the load to a higher position with a simultaneous lowering of the handle structure of the truck which is pushed against to move the truck in a forward direction. The truck illustrated is provided with means for carrying quarters of beef, but the invention is not restricted solely, so far as the invention is concerned, to transporting beef quarters but may, with variations in design, be utilized for moving and transporting other relatively heavy articles or materials.

It is an object and purpose of the present invention to provide a hand truck having the qualities stated, which is of a novel design, readily manufactured and economically produced, and is made largely of tubular stock having strength coupled with a minimum of weight.

An understanding of the invention, and of a preferred structure embodying it, may be had from the following description, taken in connection with the drawings, in which Fig. 1 is a front elevation of the truck.

Fig. 2 is a side elevation thereof.

Like reference characters refer to like parts in the different figures of the drawings.

Figures 3, 4:
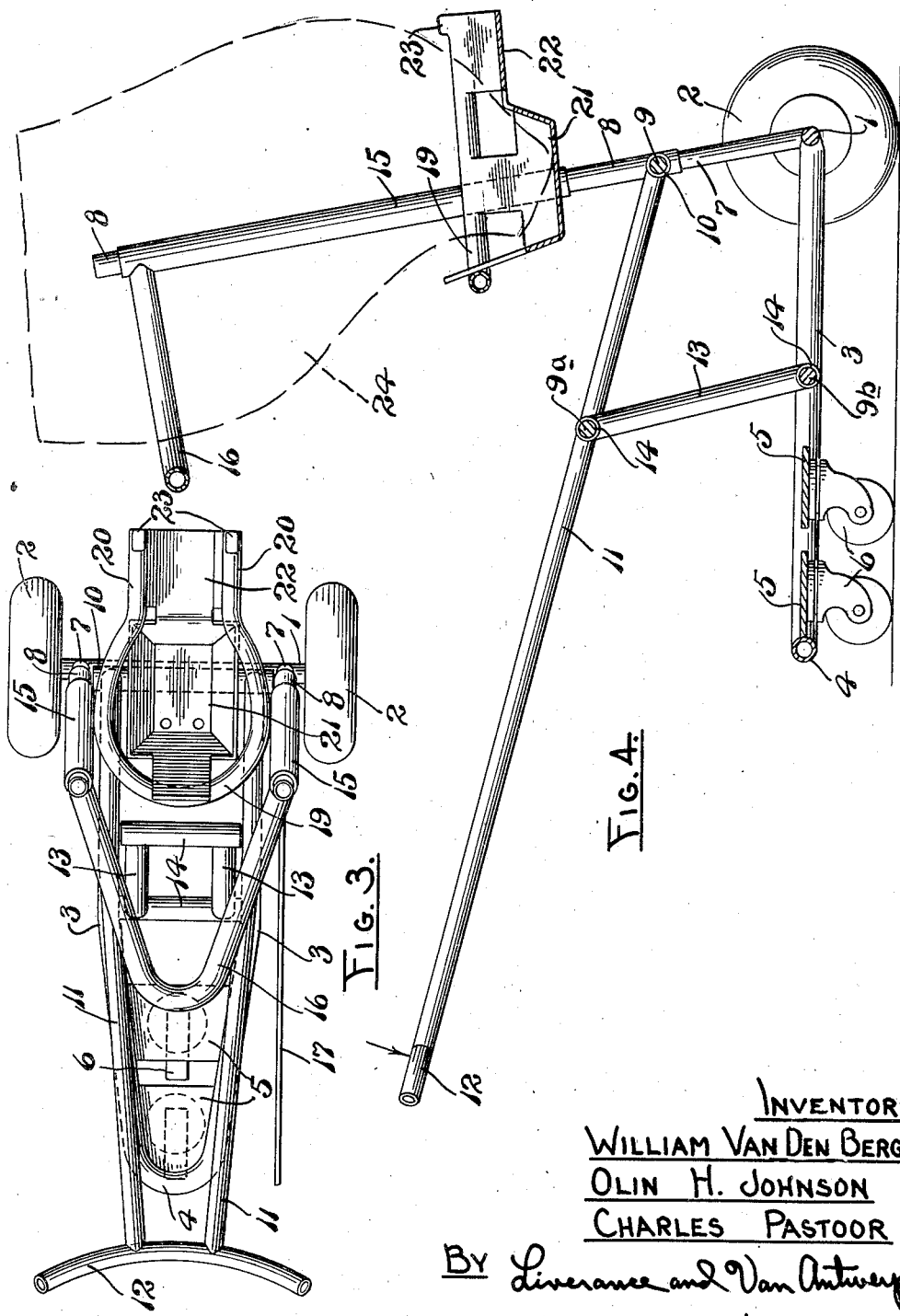
Fig. 3 is a plan view.
Fig. 4 is a fragmentary longitudinal section showing the truck in its operative pushing position.

In the construction of the truck, an axle 1 preferably in the form of a rod, at its ends is equipped with suitable wheels 2. A platform made of a single length of tubing is provided having the tubing bent into substantially U-shaped form to make spaced sides 3, the front ends of which are welded to the axle 1, the rear ends of the sides 3 being integrally connected by the bend at 4. Flat metal plates 5 (Figs. 3 and 4) are located one at the rear portion of the platform frame and the other spaced a short distance in front thereof, and welded at their ends to the sides 3 and the bend at 4. Centrally disposed casters 6 are connected to and extend downwardly from the plates 5 as shown.

Adjacent each wheel 2, a rod 7 is welded or equivalently permanently secured to the axle 1, extending in a general vertical direction and preferably somewhat inclined to the rear as shown. On each rod a sleeve 8 is telescopically mounted. Said tubes adjacent their lower ends are connected by a horizontal cross rod 9 welded at its ends thereto. A tubular sleeve 10 is located around the rod 9 and two elongated tubes 11 extend rearwardly and upwardly being welded at their front end near the ends of sleeve 8 (Fig. 1). At the outer ends of the tubular rods 11, a handle 12 of curved form as shown is permanently connected by welding. Said sides 11 and the outer handle 12 provide a means for pushing the truck in a forward direction.

Between the sides 11 described, at a distance back of the cross rod 9, an additional cross rod 9a (Fig. 4) extends, welded at its ends to the sides 11 and, similarly, back of the shaft 1 a rod 9b (Fig. 4) extends between the sides 3 of the lower platform. Tubular sleeves 14 are located around the rods 9a and 9b and tubular struts 13 extend between the sleeves 14 and have a welded connection thereto. Thus the elongated sleeves 8, and whatever may be mounted and carried thereon, may be elevated on the rods 7 as guides therefor to an upper position shown in Fig. 4 by simultaneously moving the handle at 12 downwardly into the proper position for the one operating the truck to push it in a forward direction.

Two additional tubular sleeves 15 are slidably telescoped one over each of the sleeves 8. A lever 17 is pivotally mounted near the lower end of one of the sleeves 15, and has an engaging dog 17a for entrance into any selected one of the plurality of spaced notches or recesses 18 in the associated tube 8. Adjacent their upper ends the sleeves 15 have connected thereto the sides or legs of a substantially V-belt tubular member 16 which extends rearwardly over the side members 11 of the pusher handle structure.

A tubular loop 19, having forwardly extending spaced substantially parallel sides 20, is located between the tubular sleeves 15, above the lower ends of the sleeve and welded at opposed sides to the said sleeves. Such loop provides a support for a pan of sheet metal which is connected thereto, having at the wider rear portion of the loop a downwardly extending recessed part 21, and between the sides 20 a raised portion 22 above the bottom of the part 21. At the outer ends of the sides 20 upwardly extending projections 23 are made. Such pan structure is one design for carrying beef quarters indicated in dash lines 24 in Figs. 2 and 4, and of different shape; the one in Fig. 4 having a downwardly extending neck portion entering the downwardly recessed portion 21, the upper part being supported by the V-member 16, and extending between the upper portions of the sleeves 15. In Fig. 2 the material to be carried on the truck rests upon the sides of the loop 19 and 20 and is held against forward disengagement therefrom by the stops at 23. Of course other articles to be carried on the truck supports may have designed in conformity structures of supports which may be substituted for the particular and specific one which is shown.

In the operation, before the truck is loaded, by release of the latching dog at 17a the sleeves 15 and the structure carried thereby may be moved to a preselected position on the tubular sleeves 8. The truck may then be loaded, as in Fig. 2 for example, and then by pulling the handle at 12 downwardly and to the rear, the sleeves 15 and the parts connected therewith, together with whatever load has been placed on the truck are lifted to the position shown in Fig. 3 and the handle brought to a lower position, at which the operator may most conveniently push the truck in a forward direction. On reaching a destination, the handle 12 is elevated to the position shown in Fig. 2 with a lowering of the load for its easier removal. As shown in Fig. 2, where the truck is used for example in loading freight cars which carry beef quarters in storage, the spaced casters 6, one in front of the other, will move readily over the spaced floor slats or bars 25 of such cars, one of said casters at all times being against the upper side of a bar 25.

The structure described has proved very practical and useful, is sturdy in construction and may be economically made.

The invention is defined in the appended claims and is to be considered comprehensive of all forms of structure coming within their scope.

We claim:

1. A truck structure comprising a platform having an axle at its front end, wheels mounted at the ends of the axle, roller supports for the rear portion of the platform, two spaced rods extending in a generally vertical direction from said axle and permanently connected thereto, tubular members telescoping over said rods and movable lengthwise thereof, article carrying means disposed between and connecting said tubular members, handle means including a pair of rearwardly and upwardly extending elongated rods pivotally connected to said tubular sleeves adjacent their lower ends, a generally vertical strut pivotally connected at its upper and lower ends respectively to said handle means and to said platform between their respective ends, and a handle connecting said rearwardly and upwardly extending rods at their rear ends said rods being operable as a lever to move said tubular sleeves lengthwise of the first mentioned rods.

2. In a truck construction, a platform comprising, a single length of material of substantially U-shaped form having spaced sides, an axle to which the ends of said sides are permanently secured, wheels on the axle, rollers connected at the rear of and extending downwardly from the platform, spaced rods extending upwardly from said axle and permanently connected thereto, a tubular sleeve telescoping over each rod, a transverse rod between the lower ends of said sleeves permanently connected at its ends thereto, article carrying means mounted on said sleeves, handle rods extending rearwardly from said transverse rod, a tubular member through which the transverse rod passes and to which the front ends of said handle rods are permanently secured, a handle connecting the free ends of said handle rods, and fulcrum means pivotally connected at its lower end to the platform between the ends thereof and to said handle rods between their ends at its upper end.

3. A construction as defined in claim 2, and additional sleeves telescopically receiving said first mentioned sleeves and movable lengthwise thereof, means for holding said additional sleeves at a plurality of positions in the length of the first sleeves, said article holding means being permanently secured to and extending between said additional sleeves, and manually operable means for releasing said holding means to permit downward movement of said additional sleeves and the carrying means connected therewith to a lower position.

4. A truck comprising a wheel mounted platform, two spaced vertical posts extending upwardly from said platform, an article carrying frame comprising two tubes slidably mounted on said posts, a horizontal V-shaped frame member connecting the upper ends of said tubes and a pan shaped member near the lower ends of the tubes, and a hand lever having a fulcrum on said platform and connected to said article carrying frame for elevating it.

WILLIAM VAN DEN BERGH.
OLIN H. JOHNSON.
CHARLES PASTOOR.

REFERENCES CITED

The following references are of record in the file of this patent:

UNITED STATES PATENTS

| Number | Name | Date |
|---|---|---|
| 1,015,393 | Murphy | Jan. 23, 1912 |
| 1,293,699 | Cannon | Feb. 11, 1919 |
| 1,530,014 | Sarff et al. | Mar. 17, 1925 |
| 1,559,923 | West | Nov. 3, 1925 |
| 2,081,504 | Quick | May 25, 1937 |

FOREIGN PATENTS

| Number | Country | Date |
|---|---|---|
| 370,828 | Great Britian | Apr. 14, 1932 |
| 92,358 | Sweden | Mar. 17, 1938 |